Dec. 2, 1947.   M. L. PUGH   2,432,068
BATTERY TESTING AND CHARGING SYSTEM
Filed Feb. 3, 1941
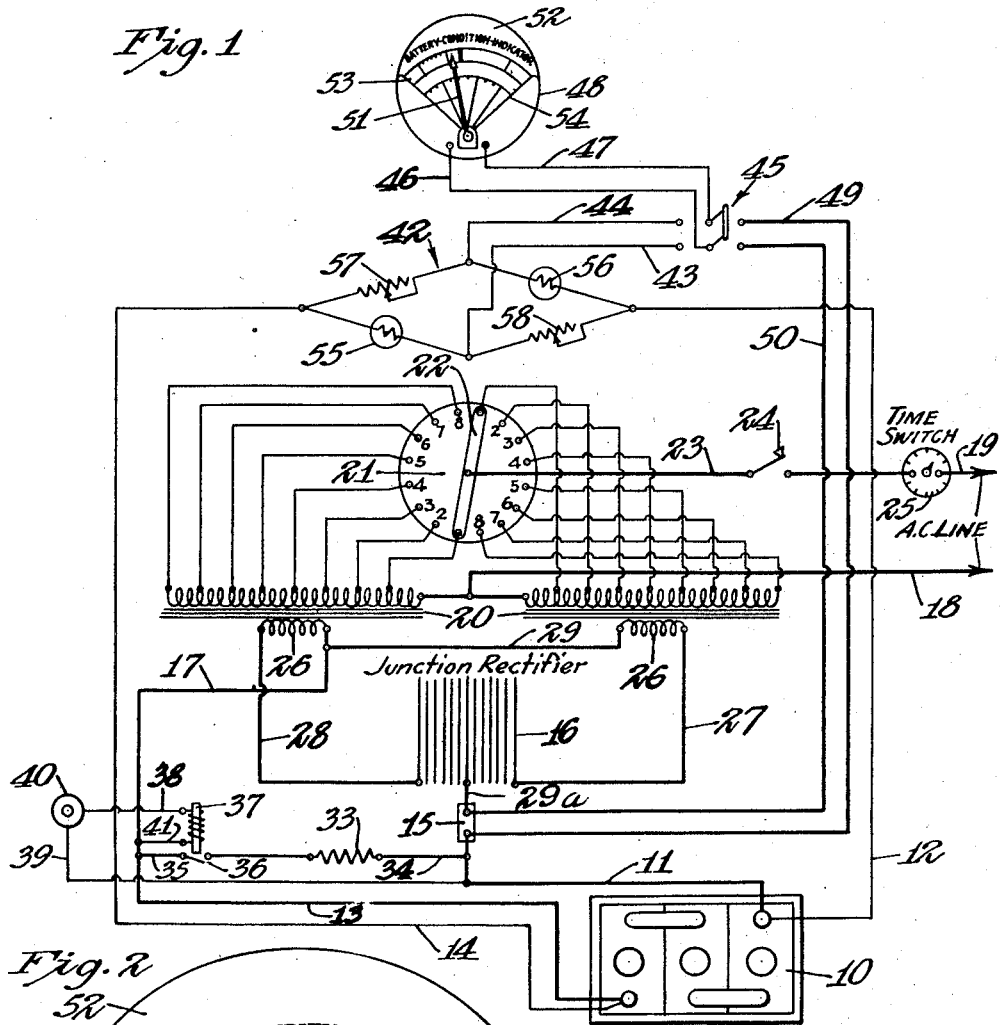
Inventor
Merlin L. Pugh Patented Dec. 2, 1947

2,432,068

UNITED STATES PATENT OFFICE 2,432,068

BATTERY TESTING AND CHARGING SYSTEM

Merlin L. Pugh, Minneapolis, Minn.

Application February 3, 1941, Serial No. 377,117

4 Claims. (Cl. 320—48)

This invention relates to a system for testing storage batteries of the type commonly used in motor vehicles and then charging them for the period of time indicated as sufficient by the test.

A particular object of this invention is to provide means for quickly testing weakened or defective batteries, distinguishing between the various types of common defects and weaknesses and indicating, in cases where recharging may be effectual, the time required to properly recharge the battery at a high but safe rate, in combination with a charger adapted to charge the battery without changing the test leads and with simple adjustment of charging rate and time controls.

Another object is to provide in a battery charging and testing system a combination voltmeter and ammeter instrument calibrated on the voltmeter dial or scale with legends adapted to indicate without further reference the time required to properly charge a weak battery and its condition during charging and also having an ammeter scale calibrated with legends to indicate the condition of the battery during charging, the system having testing and charging circuits and said instrument being included in both circuits under control of a selector switch.

A further object is to provide a combination testing and charging system of unusually simple and inexpensive construction wherein the number of instruments and controls is reduced to a minimum and whereby the time required for testing and charging the great majority of weak batteries is minimized.

Other objects will appear and be more fully pointed out in the following specification and claims.

Referring to the accompanying drawing:

Figure 1 is a diagrammatic illustration of my complete testing and charging system;

Fig. 2 is a plan view showing the meter dial with appropriate legends thereon, and Fig. 3 is a plan view of the time switch dial.

In the drawings the numeral 10 indicates a battery to be tested, such as an ordinary three-cell, six-volt, lead-acid battery for motor vehicles. One terminal of the battery 10 is adapted to be connected in the testing and charging circuits by leads 11 and 12, and the other terminal by leads 13 and 14. The lead wire 11 extends to an ammeter shunt 15 and one terminal of a junction rectifier 16. The lead 13 is connected by a wire 17 to another terminal of the rectifier.

Alternating current for charging the battery is supplied from a suitable source by power leads 18 and 19. The lead 18 extends to the primary coils of a pair of transformers 20, which coils are tapped at suitable intervals and have circuit connections with a charging rate control switch indicated generally by the numeral 21. For regulating the charging rate, the switch 21 has a manually operable, rotary contact member 22 adapted to connect similarly numbered terminals of the transformer taps. Current is supplied to the member 21 from the lead 19 by a wire 23 which is in series with a main power switch 24 and a time switch 25. The secondary coils 26 of the transformers 20 are connected by wires 27 and 28 to the rectifier 16, these coils having a common output connection consisting of a wire 29 extending to the wire 17. The rectifier output circuit is completed by a wire 29a extending from a central terminal of the rectifier to the shunt 15.

The time switch 25 is of the common type having clock mechanism for opening the circuit automatically upon the expiration of the period of time for which the switch has been manually set. A suitable arrangement of dial for this switch is indicated in Fig. 3. The switch has a manually operable knob 30 and hand 31 adapted to be turned to wind the clock spring and indicate the period in minutes that the switch is to be held closed for a particular charging operation. The dial 32 for the switch is graduated in minutes. By operating the contact member 22 of the charging rate switch 21 in a clockwise direction from the initial position indicated, the rate of charge may be progressively increased. This switch is ordinarily set to charge the battery at a maximum high rate of from 80 to 100 amperes at the start of the charging operation.

Extending in parallel to the charging circuit hereinbefore described is a battery discharge or load circuit, including a low resistance 33, wires 34 and 35 and a spring contact 36 of a relay 37. The wire 34 is connected to the power lead 11 and the wire 35 to the lead 13. The coil of the relay 37 is in circuit with wires 38 and 39 and a manual switch or push button 40 which is spring biased to open position. The wire 39 connects the switch 40 to the wire 11 and a wire 41 connects one terminal of the winding of relay 37 with the wire 13 so that when the switch 40 is closed the relay 37 is energized to close the contact 36 and thereby discharge the battery through the low resistance 33. The resistance of this circuit, including the resistance 33, is preferably equal to the normal resistance of the starting circuit of the motor vehicle.

My test circuit includes the wires 12 and 14 which extend to opposite terminals of a Wheatstone bridge network indicated generally by the numeral. A voltmeter bridge circuit includes wires 43 and 44 which extend to a double throw selector switch 45 and wires 46 and 47 extending from said switch to the terminals of a combination voltmeter and ammeter instrument indicated generally by the numeral 48. This meter is adapted to be connected by the switch 45 either with the voltmeter circuit wires 43 and 44 or with ammeter circuit wires 49 and 50 which extend to opposite ends of the shunt 15. A hand 51 of the meter 48 is movable over a dial 52 having an outer voltmeter scale indicated generally by the numeral 53 and an inner ammeter scale indicated generally by the numeral 54. The voltmeter scale is subdivided into a testing zone and charging zone, as indicated by the legends in Fig. 2. The testing zone is calibrated to indicate without further reference the period of time that is required to properly charge the particular battery at a predetermined maximum rate and while the battery is being discharged through the circuit including resistance 33. For this purpose, the larger central segment of the testing zone is graduated in minutes. The testing zone is also provided with a segment at its lower end bearing a legend indicating that a battery with extremely low voltage should not be charged until a further test is made and at the upper end of the test zone is a segment and legend indicating that the battery under test is fully charged. The charging zone segment of the voltmeter scale is utilized during the charging of the battery to indicate by reference to the position of the meter hand 51 whether the resistance of the battery is normal or abnormally high, as in the case of a sulphated battery, which cannot be recharged at a high rate.

The ammeter scale 54 is calibrated to indicate the charging rate in amperes, assuming that the resistance of the battery under charge is normal and has legends associated with appropriate segments thereof to indicate by reference to the movable hand 51 whether the battery being charged is in good condition or whether it is in such condition that the rate of charging should be changed. If the battery is in good condition, with the charging rate set to the maximum, for example, at the 80 ampere rate, the meter hand 51 should point to the 80 ampere mark in the normal starting zone and will gradually drop back to the normal finish zone as the time for opening of the timing switch approaches. Where the charger is set for the normal maximum charging rate but the meter hand indicates excessive charging rate, the switch member 22 should be readjusted in order to avoid overheating of the battery. Excessively low charging rate, as indicated on the left segment of the ammeter scale, is a warning that the connections are poor and that proper adjustments or repairs should be made.

The Wheatstone bridge network 42 in the voltmeter circuit is provided to correct the range of the meter to correspond to the variation range of the battery voltages and to insure clear, accurate indications of small variations in battery voltages. This range is ordinarily equal to approximately one volt, as the voltage of a fully charged battery is equal to about 5.7 volts and that of a weak or fully discharged battery about 4.7 volts. Resistances 55 and 56 of such character as to compensate for temperature variations are provided in opposite arms of the network 42 and variable resistances 57 and 58 are included in the other two arms of the network respectively. The latter are adjusted to depress the zero of the voltmeter scale to correspond to the voltage of a fully discharged, weak or worn out battery which is ordinarily approximately 4.7 volts. The other extreme of the testing zone range corresponds to the voltage of a fully charged battery, usually 5.7 volts. The range of the charging zone of the voltmeter scale corresponds to the normal charging voltage range, namely, from approximately 6 to 8 volts.

*Operation*

When a battery is to be tested, the leads 11 and 12 are clamped to one terminal of the battery and the leads 13 and 14 to the other terminal. This may be done by the use of suitable clamps of common type and without removing the battery from the vehicle. When this connection is made the power switch 24 should be open and the charging rate control switch 21 set for the minimum charging rate, the switch 40 being normally held in open position by its spring. To test the battery, the switch 45 is moved to close the voltmeter circuit, including the wires 43 and 44 and then the switch 40 is closed momentarily and only long enough to obtain an accurate meter reading. The switch 40 closes the circuit through the relay 37 which actuates the spring contact 36 to close the battery load circuit including the resistance 33 and wires 34 and 35. The battery is thus discharged at a rate corresponding to that required for operating the starter of the vehicle and the meter hand 51 indicates the condition of the battery by reference to the testing zone of the scale 53. If the hand 51 indicates that the battery is fully charged and the vehicle starter has not been properly operating, the defect must be found in the starter circuit. In this case further charging of the battery is unnecessary.

If the observed meter reading is in the center sector which is calibrated to indicate charging time, the battery should be charged for the number of minutes indicated by the meter hand and at a rate not to exceed a predetermined maximum of from 80 to 100 amperes. If the observed meter reading is in the left or low sector of scale 53, the battery may be either partially discharged or sulphated or worn out. To determine whether or not the battery can be recharged the following test is made. With the charging control switch 21 in the low position and the power switch in the off position, the time switch 25 is set for five minutes by appropriate operation of the knob 30 and hand 31. The power switch 24 is then closed and a suitable charging rate of from 80 to 100 amperes is secured by suitable adjustment of the switch contact member 22. This rate of charging is maintained for a five minute period and then the time switch 25 automatically opens the circuit. The power switch 24 is then opened and the charging control switch 21 moved to the low position. The condition of the battery is again tested by closing the switch 40 and selector switch 45 to obtain the voltmeter reading. If the observed meter reading is in the center sector of the testing zone the battery is in proper condition for recharge and should be further charged for the number of minutes indicated by the meter pointer. On the other hand, if the observed meter reading is still in the "Do not charge" sector of the testing zone, the battery is either sulphated or worn out. In the latter case the subsequent procedure is to again charge the battery at the 80 to 100 ampere rate and while charging note the position of the meter pointer on the battery condition indicator scale 53. For this purpose the switch 45 is actuated to close the voltmeter circuit. The position of the meter hand on the battery condition indicator scale is again noted and if the hand still indicates extremely high voltage (in highest voltage sector), the battery is sulphated and should be given a long slow charge in conventional manner to break down the sulphation. If during this test recharging the meter hand is in the left part of the "Start charge" sector, the battery is worn out and should be discarded.

Preparatory to charging a battery, the depth of the electrolyte above the battery plates and separators should be properly regulated and the vent plugs should be removed. Assuming that the power switch 24 is in its open position, the charging rate switch 21 in its low charge position and that the leads 11, 12, 13 and 14 are properly connected to the battery 10, the latter may be charged by setting the time switch 25 for the number of minutes indicated by the meter pointer when the battery was tested and then closing the power switch 24 and adjusting the charging rate by appropriate operation of the contact member 22. Now the battery condition and actual charging rate may be determined by observation of the position of the hand 51 with reference to the ammeter scale, after turning the switch 45 from the voltmeter to the ammeter operating position. When the charging rate is set for a maximum of from 80 to 100 amperes, these rates will be indicated on the ammeter scale if the battery is in good condition but merely discharged. In that case the rate of charge at the start of charging will automatically be reduced by the increase in the battery resistance as the battery becomes charged. If the battery resistance does not increase and thereby reduce the charging rate within a reasonable period of time, the rate should be reduced manually by suitable adjustment of the switch 21 to prevent possible overheating of the battery. As a further check on the condition of the battery, during charging the selector switch should be operated to render the voltmeter circuit operative and the readings thus obtained should be compared with the ammeter readings. At the beginning of the charging period normally high battery voltage and low charging rate or rapidly dropping battery voltage readings and increasing rate of charge are conditions that indicate a sulphated battery. When either of these conditions are found, the charging rate should be reduced until the sulphation breaks down. It will be evident that the test switch 40 should not be closed while the power switch 24 is closed, that is, during the charging of a battery. Other methods of use of my invention will be obvious to those skilled in this art.

My improved testing and charging system, as will be evident from the foregoing description, facilitates determinations of the cause of the several types of battery weakness and defects. It also affords means for correcting the condition if this can be done by proper charging of the battery. Both the testing and charging are accomplished in a minimum of time and by following the simple directions, most of which are indicated by legends on the dial of the meter 52, damage to the batteries caused by excessive heat and overcharging may be readily avoided.

Having described my invention, what I claim as new and desire to protect by Letters Patent is:

1. Battery testing apparatus comprising a load circuit having a predetermined fixed resistance adapted to discharge a battery at a normally high rate, a meter circuit connected to the battery terminals, a switch for clos'ng said load circuit and a voltmeter included in said meter circuit, and calibrations and legends on the face of said voltmeter, said calibrations being placed thereon in predetermined relat'on to said fixed resistance to thereby indicate without further reference the time required to charge said battery at a predetermined high rate, said voltmeter being operative when said switch is closed.

2. Battery test'ng apparatus comprising a battery load circuit, a switch for closing said load circuit, said switch being biased to opened position and manually closable against the bias, a resistance in said load circuit having an ohmage value substantially equal to that of a starting motor, a voltmeter carried across the battery terminals when said switch is closed, said voltmeter including calibrations and indicia for d'rectly determining without the necessity of calculations the time in minutes during which the battery may be charged at a high rate without injury thereto.

3. Battery testing apparatus for high rate battery charging comprising a meter circuit adapted to be connected to terminals provided on said battery, a battery load circuit adapted to be connected to said battery terminals, a fixed resistance in said battery load circuit, a switch for closing said load circuit during testing which switch is open at times other than during the testing operation, and a voltage responsive meter connected in said meter circuit, said meter including indicia placed thereon in predetermined relation to said fixed resistance to visually determine in time units, without the necessity of calculations, the period of time required to substantially fully charge the battery at a high rate.

4. Battery testing apparatus for high rate battery charging comprising a meter circuit adapted to be connected to terminals provided on said battery, a battery load circuit adapted to be connected to said battery terminals, a fixed load having an ohmage value substantially equal to that of a starting motor in said battery load circuit, a switch for closing said load circuit during testing, and a voltage responsive meter connected in said meter circuit, said meter including indicia to visually determine in time units, without the necessity of calculations, the period of time required to substantially fully charge the battery at a high rate.

MERLIN L. PUGH.

REFERENCES CITED

The following references are of record in the file of this patent:

UNITED STATES PATENTS

| Number | Name | Date |
| --- | --- | --- |
| 1,879,530 | Schaf | Sept. 27, 1932 |
| 2,096,131 | Oestermeyer | Oct. 19, 1937 |
| 2,158,979 | Breisch | May 16, 1939 |
| 2,227,118 | Amsden | Dec. 31, 1941 |
| 2,246,163 | Cheeseman | June 17, 1941 |
| 2,254,846 | Heyer | Sept. 2, 1941 |

OTHER REFERENCES

"Experimental Electrical Engineering" (Karapetoff), vol. 1, 2d ed. 1910, pages 403 and 404, John Wiley and Sons. New York.